(12) United States Patent
Burrows et al.

(10) Patent No.: US 7,028,039 B2
(45) Date of Patent: Apr. 11, 2006

(54) SYSTEM AND METHOD FOR STORING CONNECTIVITY INFORMATION IN A WEB DATABASE

(75) Inventors: Michael Burrows, Palo Alto, CA (US); Keith H. Randall, Sunnyvale, CA (US); Raymond P. Stata, Palo Alto, CA (US); Rajiv G. Wickremesinghe, Durham, NC (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 951 days.

(21) Appl. No.: 09/766,336

(22) Filed: Jan. 18, 2001

(65) Prior Publication Data

US 2002/0138509 A1 Sep. 26, 2002

(51) Int. Cl.
*G06F 7/00* (2006.01)

(52) U.S. Cl. .............................. 707/101; 707/7; 707/10; 707/102

(58) Field of Classification Search ................ 707/101, 707/7, 102, 10
See application file for complete search history.

(56) References Cited

U.S. PATENT DOCUMENTS 6,073,135 A * 6/2000 Broder et al. ................ 707/100

OTHER PUBLICATIONS

Shay, Understanding Data Communication & Networks, copyright 1999 by Brooks/Cole Publishing Company, Second Edition, pp. 188-192.*

* cited by examiner

*Primary Examiner*—Shahid Alam
*Assistant Examiner*—Hung Pham (57) ABSTRACT

A web crawler system includes a central processing unit for performing computations in accordance with stored procedures and a network interface for accessing remotely located computers via a network. A web crawler module downloads pages from remotely located servers via the network interface. A first link processing module obtains page link information from the downloaded page; the page link information includes for each downloaded page a row of page identifiers of other pages. A second link processing module encodes the rows of page identifies in a space efficient manner. It arranges the rows of page identifiers in a particular order. For each respective row it identifies a prior row, if any, that best matches the respective row in accordance with predefined row match criteria, determines a set of deletes representing page identifiers in the identified prior row not in the respective row, and determines a set of adds representing page identifiers in the respective row not in the identifier prior row. The second link processing module delta encodes the set of deletes and delta encodes the set of adds for each respective row, and then Huffman codes the delta encoded set of deletes and delta encoded set of adds for each respective row.

17 Claims, 7 Drawing Sheets

FIG. 1
(Prior

SYSTEM AND METHOD FOR STORING CONNECTIVITY INFORMATION IN A WEB DATABASE

The present invention relates generally to web crawlers and other systems that maintain a database of information about web pages, and particularly to a data structure for efficiently representing link information in a web database.

BACKGROUND OF THE INVENTION

Web crawlers and other systems as well maintain a database of information about web pages or documents accessible via a network. The network for which the database is maintained may be the Internet or may an Intranet or other network, but for convenience we will herein refer to this database as a "web database." The web database will generally store the address of each known web page, as well as information about the outbound links in the web page to other web pages. The addresses of web pages are often called universal resource locators (URL's). Some web databases also store for each page information about all the links (herein called inbound links) in other web pages that point to this web page. Of course, the web database can also store additional information about the web pages, such as the last time the page was downloaded, the page's stated expiration date, a fingerprint or sketch or other representation that allows the page to be efficiently compared with other pages without having to compare the actual contents of the pages, and so on.

Figure 1:
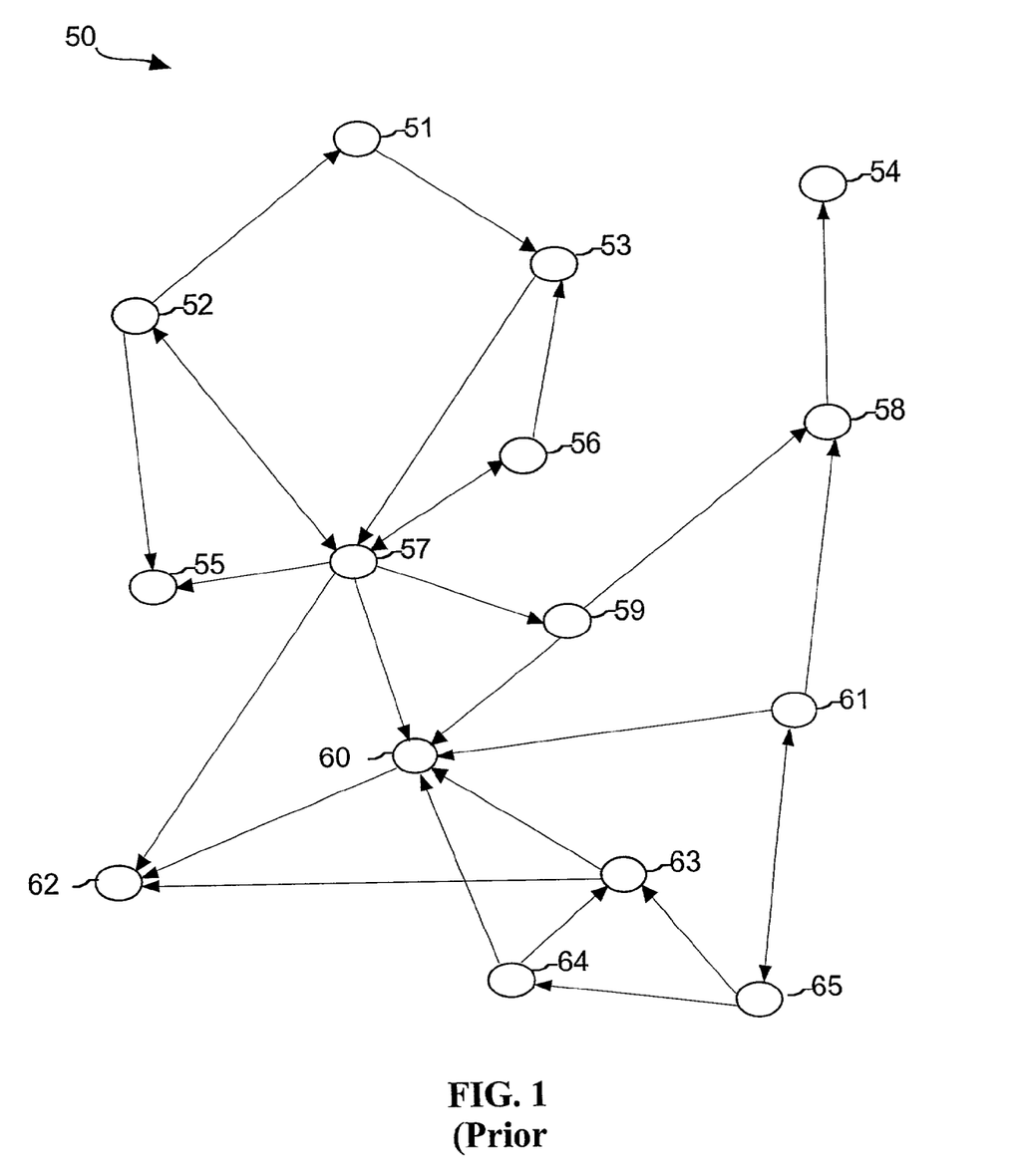
FIG. 1 is a block diagram depicting a set of linked data sets.

Referring to FIG. 1, there is shown a small portion of a hypothetical set 50 of interlinked pages 51–65 in a network. This figure shows inbound links and outbound links for each page. The present invention is directed to a memory space efficient system and method for storing the outbound and/or inbound link information for a set of pages in a network.

If the number of web pages in the network is large, the amount of memory required to store the URL's and links in the web database will be correspondingly large. In systems in which it is important or desirable to store the entire web database in high speed random access memory, such as in web crawler systems, it is desirable for the link information to be stored efficiently so as to reduce the amount of memory required to store the web database.

SUMMARY OF THE INVENTION

One aspect of the present invention is a web crawler system that includes a central processing unit for performing computations in accordance with stored procedures and a network interface for accessing remotely located computers via a network. A web crawler module downloads pages from remotely located servers via the network interface. A first link processing module obtains page link information from the downloaded pages; the page link information includes for each downloaded page a row of page identifiers of other pages. A second link processing module encodes the rows of page identifies in a space efficient manner. It arranges the rows of page identifiers in a particular order. For each respective row it identifies a prior row, if any, that best matches the respective row in accordance with predefined row match criteria, determines a set of deletes representing page identifiers in the identified prior row not in the respective row, and determines a set of adds representing page identifiers in the respective row not in the identifier prior row. The second link processing module delta encodes the set of deletes and delta encodes the set of adds for each respective row, and then Huffman codes the delta encoded set of deletes and delta encoded set of adds for each respective row.

Another aspect of the present invention is a method and computer program product for compressing and storing web page link information, representing links between web pages. The computer program product comprises the aforementioned first and second link processing modules. The method includes obtaining page link information for a set of pages, the page link information including for each page a row of page identifiers of other pages. The rows of page identifiers are arranged in a particular order. Then, for each respective row, the method identifies a reference row, if any, that best matches the respective row in accordance with predefined row match criteria. The respective row is encoded as an identifier for the identified reference row, if any, a set of deletes representing page identifiers in the identified reference row not in the respective row, and a set of adds representing page identifiers in the respective row not in the identified reference row. The encoding of the respective row includes delta encoding the set of deletes and delta encoding the set of adds for each respective row, and further includes Huffman coding the delta encoded set of deletes and delta encoded set of adds for each respective row.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 2:
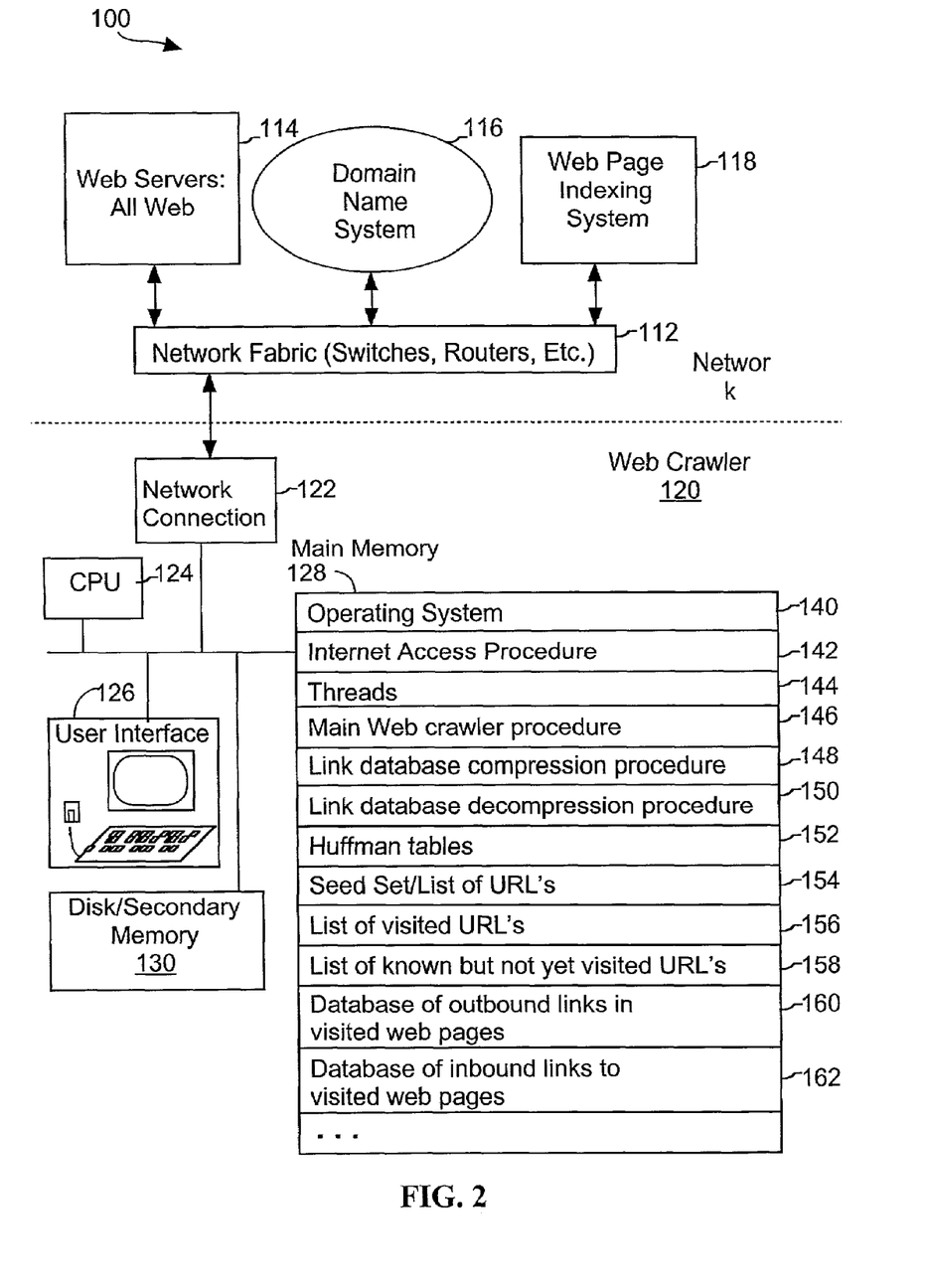
FIG. 2 is a block diagram of an exemplary distributed computer system, including a web crawler or other computer for implementing the present invention.

FIG. 2 shows an exemplary embodiment of a distributed computer system 100. The distributed computer system 100 includes a web crawler 120 connected to a network 110 through the network fabric 110 of the network. The network 110 may be a global communication network, such as the Internet, or a private network, sometimes called an Intranet. Network fabric 112 may include switches, routers, electrical and fibre optic cables, and so on.

The network 110 includes web servers 114 that store web pages. The network 110 may optionally include a service known as a domain name system 116, it may also optionally include a web page indexing system 118. The domain name system 116 is a distributed database that provides the mapping between Internet Protocol (IP) addresses and host names. The domain name system 116 may be accessed by the web crawler 120 in the process of downloading web pages from the world wide web.

In other embodiments, the web crawler system of the present invention may operate in a network environment quite different that shown in FIG. 2. For instance, the present invention does not require the use of a domain name service, nor does it require the use of any particular network fabric 112.

Web Crawler System

The web crawler 120 includes a communications interface, or network connection, 122, one or more CPU's 124, an operator interface 126 (which may be remotely located on another computer), primary or main memory 128 and secondary (e.g. disk) memory 130. In an exemplary embodiment, the network connection 122 is able to handle overlapping communication requests. The memory 128 includes:
- a multitasking operating system 140;
- an Intranet/Internet access procedure 142 for fetching web pages as well as communicating with the domain name system 116;
- one or more threads 144 for downloading web pages from the servers 114, and processing the downloaded web pages;
- a main web crawler procedure 146 executed by each of the threads 144;
- a link database compression procedure 148 for compressing data representing links to and from web pages;
- a link database decompression procedure 148 for decompressing data representing links to and/or from web pages;
- Huffman tables 152, which are used by the compression and decompression procedures, 148 and 150, to encode and decode link data; the Huffman tables 152 may be considered to be part of databases 160, 162;
- a set of URL's called the seed set 154;
- a list of visited URL's 156 that identifies the URL's of pages visited during a crawl of the web pages in a network (see FIG. 3);
- a list of known URL's that have not yet been visited 158;
- a database 160 of outbound links in visited web pages (see FIG. 4); and
- a database 162 of inbound link to visited web pages.

Page Link Data Structures

Figure 3:
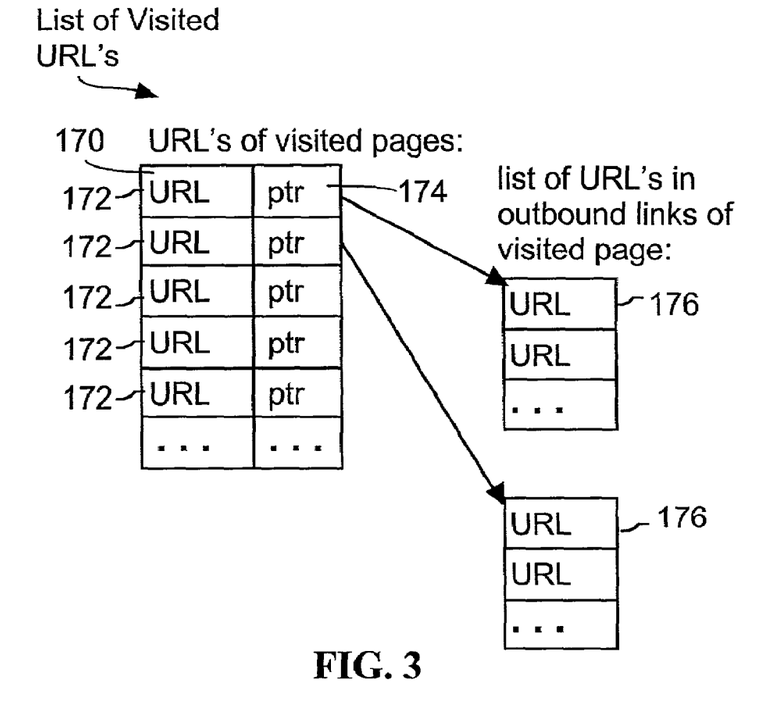
FIG. 3 is a block diagram of a data structure representing a list of visited data sets.

Referring to FIG. 3, in a preferred embodiment the list of visited URL's 156 is stored in a data structure that includes a primary list of URL entries 170, each entry including a URL 172 and a pointer 174 to a list 176 of outbound link URL's. If a visited page contains no outbound links, the pointer 174 in the corresponding entry 170 is given a null value; otherwise it points to a list 176 of outbound link URL's stored by the web crawler procedure.

Figure 4:
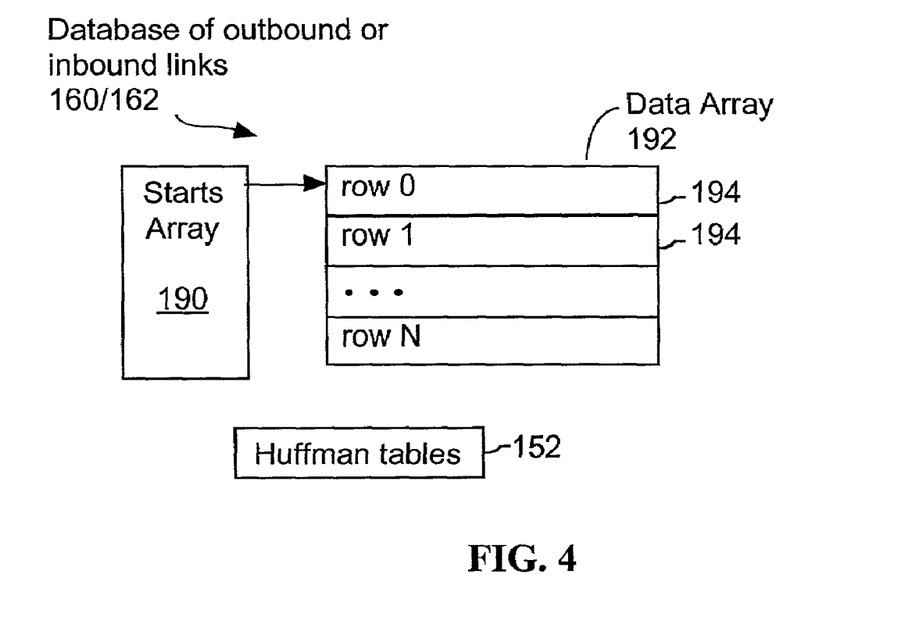
FIG. 4 is a block diagram of a data structure representing a database of outbound or inbound links.

The information in the list of visited URL's 156 is compressed by the compression procedure to form the database 160 of outbound links in visited web pages. This same information can be used to form a list of inbound links for each visited web page, which in turn can be compressed to form the database 162 of inbound links to visited web pages. Note that some of the unvisited URL's from outbound links may be invalid (there is no guarantee that the URL's in outbound links refer to existing data sets).

Using the methodology of the present invention, the average amount of memory occupied by databases 160, 162 is 4.5 to 5 bits per link.

Figure 5:
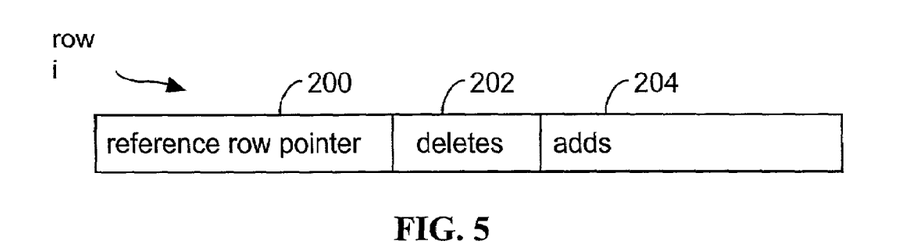
FIG. 5 is a conceptual block diagram of a data structure representing a row of the database of FIG. 4, prior to compression.
Figure 6:
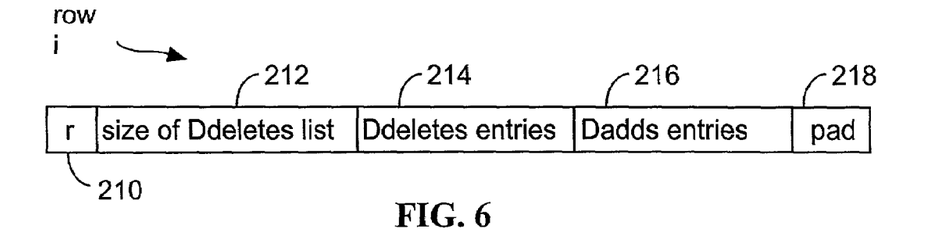
FIG. 6 is a block diagram of a data structure representing a row of the database of FIG. 4, after compression.
Figure 7:
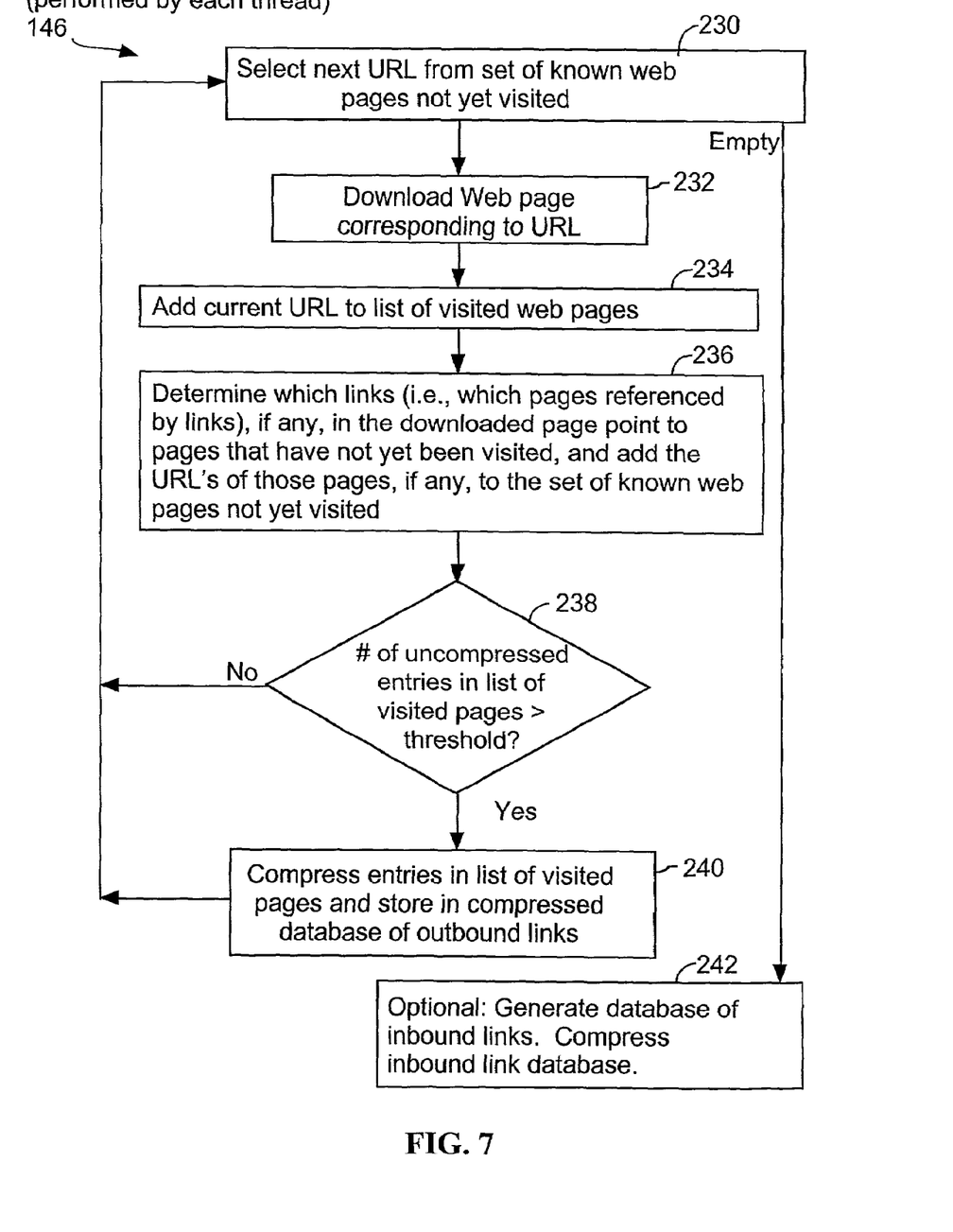
FIG. 7 is a flow chart of a web crawler procedure.

Referring to FIGS. 5, 6 and 7, we next describe the data structure used to store the outbound links of a web page. The data structure for inbound links is the same at the data structure for outbound links. Each page is identified by a page ID. In a preferred embodiment, the page ID's are positive integers densely allocated starting at zero. The page ID of a page is the same as its row index in the link information database. For each page A, we store the set of ID's of pages for which page A contains outbound links. We call this set the "row" for page A. The row is stored in sorted order (sorted by ID), with duplicates removed (i.e., if page A contains multiple links to a particular page, the page ID of that page is included only once in the row for page A).

The rows are encoded using two data structures: a Starts array 190 and a Data array 192. The Starts array 190 is indexed by page ID and contains indices into the Data array 192. The data encoding the row for page A is stored in the Data array 192 starting at the location identified by Starts[A] and continuing through the location Starts[A+1]−1, inclusive.

The encoding in the data array 192 is the result of three compression steps: reference-row compression, delta compression, and bit compression, each of which is described below.

The reference-row compression encodes a given row relative to a reference row. For each row A, we select a reference row ref(A) against which we encode row A. Instead of encoding row A directly, we store for row A a pointer to ref(A), a list of "deletes", and of "adds". As shown in FIG. 5, each row 194 of the link information database 160 or 162 includes a reference 200 to a reference row, a list of deletes 202, and a list of adds 204. The deletes and adds represent the operations required to change the reference row into A's row. Each delete is an index into the reference row of an ID which is not in A's row, and each add is an ID which is in A's row but not in the reference row. During decompression, to obtain row A, we first obtain the reference row ref(A) for A, remove the ID's from ref(A) specified by the deletes, and then add the ID's specified by the adds.

The reference row for any page A is chosen by selecting a best preceding row, row[A−r], in the database for the window 0<r<K. We choose the "best" of these preceding K−1 rows in accordance with predefined reference row selection criteria. In a preferred embodiment, the best reference row is the one for which the resulting deletes and adds sets are smallest (after estimating the effects of delta compression and bit compression, described below). If none of the preceding K−1 rows provide a good reference row, then an empty reference row is used. This condition is identified by setting r=0.

When decompressing a row, we first need to decompress its reference row, if any. Unfortunately, decompressing the reference row may require decompressing its reference row, and so on. In order to put a limit on the decompression time for a row, we put a limit on the length of these "reference chains". We set a hard limit L on the length of any reference chain, and if a row is already at the end of a chain of length L, we omit it from consideration as a reference row for any other row. This rule ensures that at most L rows need to be decompressed in order to reconstruct any row.

In alternate embodiments, other methods may be used for choosing the reference row ref(A) for row A. Such alternate methods include:

- Choose ref(A) to be the union of the previous K rows in the database. This strategy generates large reference rows, which takes advantage of the fact that deletes are cheaper to encode than adds.
- Choose ref(A) to be the union of all rows from a particular host, or of groups of N rows from hosts with more than N rows.
- Choose ref(A) to include all links that appear in at least X% of the rows from a particular host (or group of N rows from large hosts), with X chosen to balance the resulting sizes of adds and deletes.

Many other choices for reference rows are possible.

Once a reference row is selected (or constructed from a plurality of prior rows), the resulting deletes and adds lists for page A are then sorted by numeric value and passed through a delta compression step. The encoding is as follows:

```
Dddeletes[0] = deletes[0]
Ddeletes[i] = deletes[i] - deletes[i-1] - 1     i > 0
Dadds[0] = adds[0] - A
Dadds[i] = adds[i] - adds[i-1] - 1              i > 0
``` where the "D" prefix of "Ddeletes" and "Dadds" identifies the new lists as containing "delta" encoded information. Note that because we sort before delta compressing, only Dadds[0] can be negative. The delta compression changes the distribution of the values that need to be compressed, concentrating the values towards zero.

The reference row selection, r, as well as the two lists Ddeletes and Dadds, are then encoded using Huffman codes. A separate Huffman table is used for each of the following (some tables may be combined to save memory during decoding):

- the reference value r;
- the size of the Ddeletes array;
- the entries of the Ddeletes array;
- the entries of the Dadds array.

The size of the Dadds array can be deduced from the total length of the encoded data for the row.

Huffman tables are built for all values up to the maximum encountered, or a static limit (currently $2^{17}$ entries). Values larger than the static limit are encoded using an escape value. If the value to be encoded is within the table, it is encoded using its Huffman code. If it is outside the table, an escape is encoded, and then the actual value is encoded with a gamma code (or any other table-free code). The weight of the escape code in the Huffman table is chosen to represent the number of values larger than the static limit.

The Huffman tables are built during an initial pass over the data, estimating the frequency of each of the table entries.

Alternately, the Huffman tables may be computed based on an initial portion of the data (e.g., the data from ten million visited pages), rather than all the data from a crawl of the network. If the initial sample is sufficiently large, the Huffman tables will still provide good compression. This alternate embodiment is particularly useful when the network being crawled contains very large numbers (e.g., hundreds of millions or billions) of web pages.

In another alternate embodiment, if the web crawler will be used to crawl a particular network on a periodic basis, such as once per week or once per day, the Huffman tables may be built once, based on either all the data for an initial crawl or a large sampling thereof (for instance on the first N entries (e.g., ten million entries)), and then retained for future crawls.

A diagram of the resulting compressed row data structure is shown in FIG. 6. The r field 210 is the encoded reference row value, the "size of Ddeletes list" field 212 indicates the number of entries in the Ddeletes field 214 (which contains the deletes entries of the row), the Dadds field 216 contains the add entries of the row, and the pad field 218 contains as many bits (e.g., zero to three) as may be required to make the row data structure end on a permissible bit boundary (e.g., by making the size of the row data structure an integer multiple of a predefined number of bits, such as 4-bits or 8-bits).

If the reference row value r 210 is zero (representing an empty reference row), the size and entries of Ddeletes are omitted. In a preferred embodiment, the "pad" data 218 is used to make each row's data 4-bit aligned, so the Starts array 190 can use indices representing Data array location with 4-bit granularity.

Main Web Crawler Procedure

Referring to FIG. 7, the web crawler procedure 146 in one embodiment of the present invention works as follows. A URL is selected from the set of known web pages that have yet been visited by the web crawler (step 230). Initially, the set of known web pages is a seed set of pages 154 (FIG. 1). The web page at the selected URL is downloaded, step 232, and processed. The URL of the downloaded page is added a list of visited pages, step 234. A preferred data structure for the list of visited pages is shown in FIG. 3. The links in the downloaded page are identified, the URL's in those links are compared with the list 156 (FIG. 1) of visited pages to determine which, if any, are for pages not yet visited by the web crawler, and then the URL's of those pages are added to a list 158 (FIG. 1) of known web pages that have not yet been visited, step 236.

In some embodiments the web crawler is configured to compress the web page link information whenever the number of uncompressed entries in the list of visited pages exceeds a threshold value, such as ten million. In such embodiments, when this threshold is reached (238-yes), the link database compression procedure is invoked to compress the entries in the list of visited pages and to store the resulting compressed rows of information into the compressed database of outbound links, step 240. After performing the compression (240), or if the number of uncompressed entries in the list of visited pages does not exceed the threshold value (238-no), processing resumes at step 230 (described above). Either at the end of the procedure, when all known pages have been visited, or just before or after the compression procedure is called, the information in the list of visited pages may be used to construct a list of inbound links for each visited page, and then that information may be compressed and stored in a database of inbound link information (step 242), using the same compression procedure as the one used for compressing the outbound links.

If the compression step 240 is to be performed just once at the end of the crawl, decision step 238 is eliminated and compression step 240 is performed when the list of known pages not yet visited is empty (or some other crawl end condition is reached).

Link Database Compression Procedure

Figure 8:
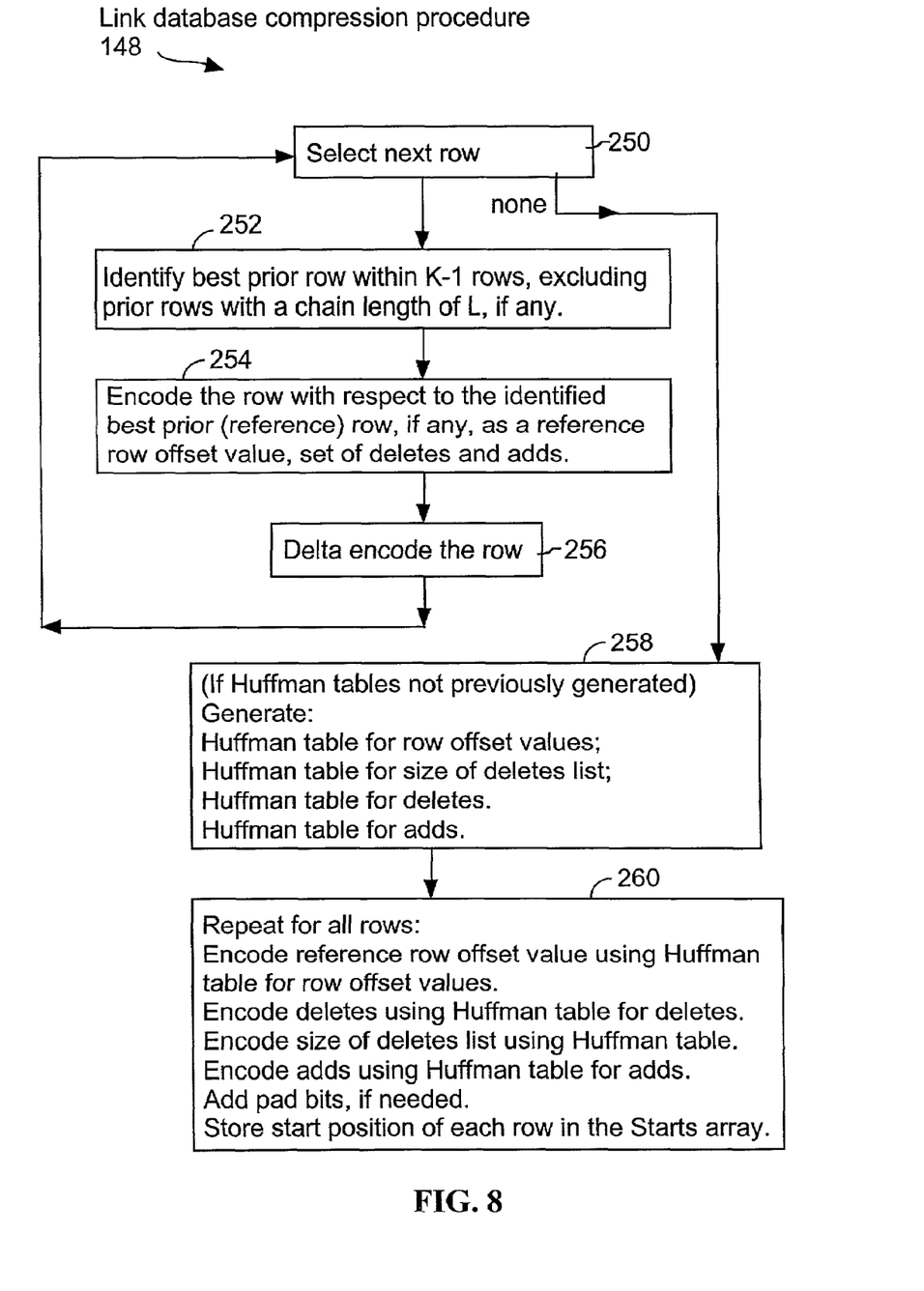
FIG. 8 is a flow chart of a compression procedure for compressing a set of row entries in a database of outbound or inbound links.

Referring to FIG. 8, the compression procedure 148 operates as follows in a preferred embodiment. Each "row" corresponds to the outbound links in, or the inbound links to, a page. The rows are processed in same order they were added to the list of visited pages by the web crawler, and thus the procedure begins by selecting a first or next row, step 250. The selected row is also called the current row. A best reference row is identified, in accordance with predefined selection criteria, step 252. In the preferred embodiments the best reference row is a reference row that results in a compressed row representation for the current row having the smallest number of bits.

In a preferred embodiment, the best reference row is a prior row having a row offset r of $0 < r < K$, excluding rows having a reference row chain length of L, that results in a compressed row representation for the current row having the smallest number of bits. As discussed above, in other embodiments the best reference row may be a composite of multiple prior rows. If the current row is the first row, and thus there are no prior rows, or all the prior rows in the window $0 < r < K$ have reference row chain lengths of L, or encoding the current row with reference to any of the candidate reference rows produces a longer data structure than encoding the current row with an empty reference row, then the best reference row is an empty reference row. In any of these cases, the identified best reference row is represented by a row offset value of zero.

Next, the current row is encoded with respect to the identified best reference row, if any, step 254. In particular, the set of links associated with the page corresponding to the current row is represented as a set of deletes and adds with respect the set of links represented by the identified best reference row. After the lists of deletes and adds for the current row have been generated, these lists are delta encoded, step 256.

Steps 250 through 256 are repeated until all the rows have been processed. Then Huffman tables are generated for the row offset values, delete list size values, delta delete values and delta add values, step 258. The Huffman tables are based on the frequency of occurrence of each row offset value, delete list size value, delta delete value and delta add value and provide a coding for each of these values that, on average, occupies the least number of bits.

Finally, all the rows are bit compressed by Huffman coding the reference row offset value, delete list size value, delete delta values and add delta values of each respective row, using the corresponding Huffman tables, step 260. Pad bits are added to each row as needed to make each row's data 4-bit aligned, and the start position of each row is stored in the Starts array, step 260.

In other embodiments the Huffman tables may be computed in advance, in which case each row is Huffman encoded after the delta encoding step 256.

Link Database Decompression Procedure

Figure 9:
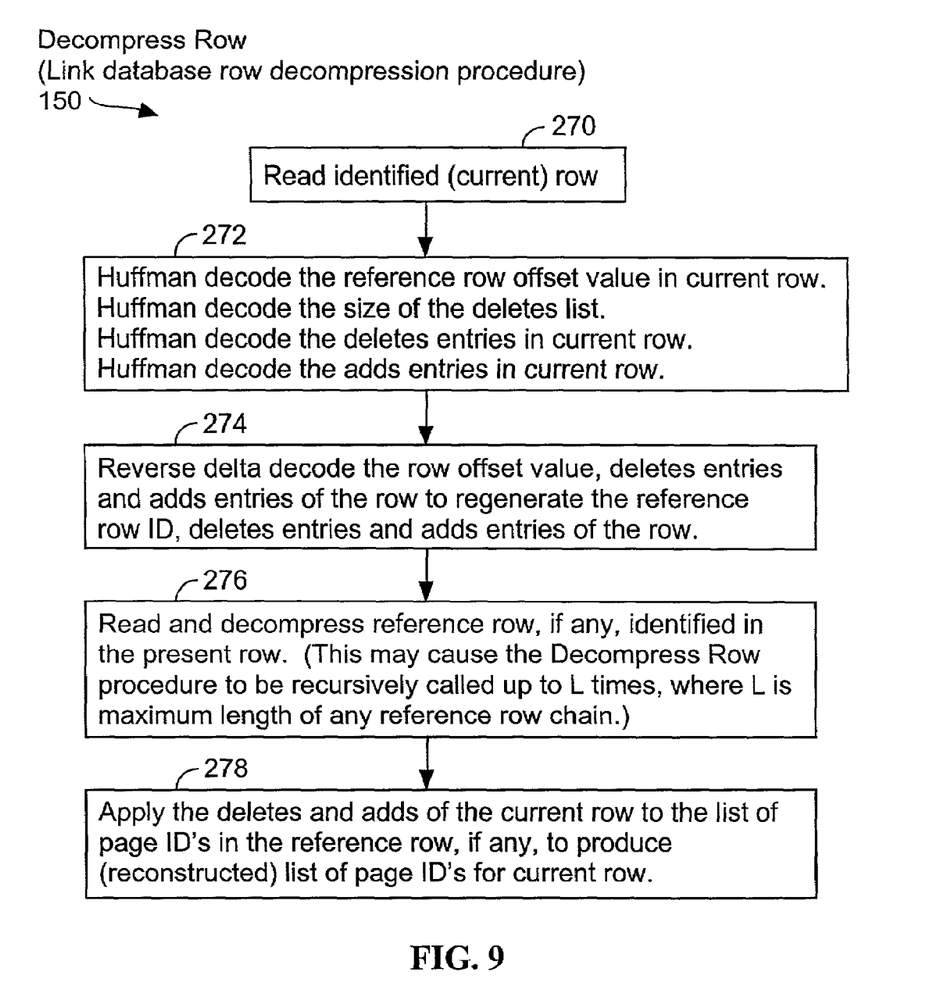
FIG. 9 is a flow chart of a decompression procedure for decompressing a row entry in a database of outbound or inbound links.

Referring to FIG. 9, the decompression procedure 150, which decompresses one identified row of the outbound or inbound links database, operates as follows in a preferred embodiment. The identified row, also called the current row, is read, using the Starts array to find its start and end positions in the Data array, step 270. The reference row offset value in the current row is Huffman decoded using the corresponding Huffman table, step 272. Similarly, the size of the deletes list, the deletes entries and the adds entries are decoded using the corresponding Huffman tables, step 272, to produce lists of delta encoded deletes and adds. Next, the row offset value, delete entries and add entries are reverse delta decoded to regenerate the reference row ID, deletes entries and adds entries of the current row, step 274.

At this point, if the reference row is not the empty row, the row decompress procedure makes a recursive call to itself to decode the reference row, step 276. The row decompress procedure may recursively call itself in this way up to L times, where L is the maximum depth of any reference row chain. When step 276 completes, the reference row is returned in the form of a list of page ID's for the reference row. Then the deletes and adds for the current row are applied to the reference row list of page ID's to produce a reconstructed list page ID's for the current row, step 278.

EXAMPLE

Suppose the rows for pages 5–9 are as shown below:
5: 17, 42, 91
6: 17, 42, 108
7: 17, 18, 91, 93
8: 18, 19, 91, 92, 93
9: 17, 91

Assume the reference window size is K=4 and the chain length limit L=3. Then the output of the reference row compression will be:
5: 0, {}, {17, 42, 91}
6: 1, {2}, {108}
7: 2, {1}, {18, 93}
8: 1, {0}, {19, 92}
9: 2, {1, 3}, {}

Applying the delta compression within each list, we get:
5: 0, {}, {12, 24, 48}
6: 1, {2}, {102}
7: 2, {1}, {11, 74}
8: 1, {0}, {11, 72}
9: 2, {1, 1}, {}

The data array contains the Huffman encodings of each of the values below, with P representing possible padding, and pointers from the starts array as indicated.

```
   starts [5]      starts [6]     starts [7]
      |               |              |
   ... 0, 12, 24, 48, P, 1, 1, 2, 102, P, 2, 1, 1, 11,
     starts [8]      starts [9]    starts [10]
        |               |             |
    74, P, 1, 1, 0, 11, 72, P, 2, 2, 1, 1, P, ...
```

Based on application of the above described link compression procedure to link data obtained from an Internet web crawler, using the above described data structures, with K=8 (i.e., a backward search limit of 7 entries) and L=4 (i.e., a maximum reference chain length of four), compression of the rows of the outbound links results in a data structure that uses about 4.5 to 5 bits per link, depending on the data set.

Alternate Embodiments

The present invention can be implemented as a computer program product that includes a computer program mechanism embedded in a computer readable storage medium. For instance, the computer program product could contain the program modules shown in FIG. 2. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of storing page link information comprising:
    obtaining page link information for a set of pages, the page link information including for each page in the set a row of page identifiers of other pages;
    arranging the rows of page identifiers in a particular order;
    for each respective row:
        identifying a reference row, if any, that best matches the respective row in accordance with predefined row match criteria; and
        encoding the respective row as an identifier for the identified reference row, if any, a set of deletes representing page identifiers in the identified reference row not in the respective row, and a set of adds representing page identifiers in the respective row not in the identified reference row, wherein the encoding for each respective row includes delta encoding the set of deletes and delta encoding the set of adds for each respective row; and Huffman coding the delta encoded set of deletes and delta encoded set of adds for each respective row.

2. The method of claim 1, including sorting the page identifiers in each row in numerical order prior to performing the encoding.

3. The method of claim 2, wherein the encoding includes generating a row distance value that identifies the identified reference row and Huffman coding the row distance value.

4. The method of claim 1, including when no reference row exists for a respective row, encoding the respective row by encoding a null reference row identifier and a set of adds representing the page identifiers in the respective row, delta encoding the set of adds for the respective row, and Huffman coding the delta encoded set of adds for the respective row.

5. A computer program product for use in conjunction with a computer system, the computer program product comprising a computer readable storage medium and a computer program mechanism embedded therein, the computer program mechanism comprising:
    a first module for obtaining page link information for a set of pages, the page link information including for each page in the set a row of page identifiers of other pages; and
    a second module for storing the page link information, including instructions for:
        arranging the rows of page identifiers in a particular order;
        for each respective row:
            identifying a reference row, if any, that best matches the respective row in accordance with predefined row match criteria; and
            encoding the respective row as an identifier for the identified reference row, if any, a set of deletes representing page identifiers in the identified reference row not in the respective row, and a set of adds representing page identifiers in the respective row not in the identifier reference row, wherein the encoding instructions of the second module include instructions for delta encoding the set of deletes and delta encoding the set of adds for each respective row, and for Huffman coding the delta encoded set of deletes and delta encoded set of adds for each respective row.

6. The computer program product of claim 5, wherein the second module includes instructions for sorting the page identifiers in each row in numerical order prior to performing the encoding.

7. The computer program product of claim 6, wherein the encoding instructions of the second module include instructions for generating a row distance value that identifies the identified reference row and Huffman coding the row distance value.

8. The computer program product of claim 5, wherein the second module includes instructions, used when no reference row exists for a respective row, for encoding the respective row by encoding a null reference row identifier and a set of adds representing the page identifiers in the respective row, delta encoding the set of adds for the respective row, and Huffman coding the delta encoded set of adds for the respective row.

9. A web crawler system, comprising:
    a central processing unit for performing computations in accordance with stored procedures;
    a network interface for accessing remotely located computers via a network;
    memory, coupled to the central processing unit, for storing procedures and data, including:
    a web crawler module, executable by the central processing unit, for downloading a set of pages from remotely located servers via the network interface;
    a first module for obtaining page link information from the set of pages, the page link information including for each page in the set a row of page identifiers of other pages; and
    a second module for storing the page link information, including instructions for:
        arranging the rows of page identifiers in a particular order;
        for each respective row:
            identifying a reference row, if any, that best matches the respective row in accordance with predefined row match criteria, and
            encoding the respective row as an identifier for the identified reference row, if any, a set of deletes representing page identifiers in the identified reference row not in the respective row, and a set of adds representing page identifiers in the respective row not in the identified reference row, wherein the encoding instructions of the second module includes instructions for delta encoding the set of deletes and delta encoding the set of adds for each respective row, and for Huffman coding the delta encoded set of deletes and delta encoded set of adds for each respective row.

10. The system of claim 9, wherein the second module includes instructions for sorting the page identifiers in each row in numerical order prior to performing the encoding.

11. The system of claim 10, wherein the encoding instructions of the second module include instructions for generating a row distance value that identifies the identified reference row and Huffman coding the row distance value.

12. The system of claim 9, wherein the second module includes instructions, used when no reference row exists for a respective row, for encoding the respective row by encoding a null reference row identifier and a set of adds representing the page identifiers in the respective row, delta encoding the set of adds for the respective row, and Huffman coding the delta encoded set of adds for the respective row.

13. A computer implemented method of storing web links of web pages, comprising:

assigning identification numbers to universal resource locators (URLs) of web pages and to URLs of web links associated with the web pages;

arranging the identification numbers of the web pages in numerical order; and encoding web links associated with a particular web page as:

(1) a pointer to another identification number having a list of identification numbers that identify web pages, (2) a list of delete numbers that represent identification numbers included in the list of identification numbers of the another identification number but not associated as web links with the particular web page, and (3) a list of add numbers that represent identification numbers associated as web links with the particular web page but not included in the list of identification numbers of the another identification number.

14. The method of claim 13 wherein the identification numbers arc consecutive integers.

15. The method of claim 13 wherein the identification numbers are positive integers densely allocated starting about zero.

16. The method of claim 13 further comprising removing, for a web page, duplicate identification numbers tat correspond to multiple web links that point to identical web pages.

17. The method of claim 13 wherein an index in a database for a respective web page is the identification number of the respective web page.

* * * * *

UNITED STATES PATENT AND TRADEMARK OFFICE
CERTIFICATE OF CORRECTION

| | | |
|---|---|---|
| PATENT NO. | : 7,028,039 B2 | Page 1 of 1 |
| APPLICATION NO. | : 09/766336 | |
| DATED | : April 11, 2006 | |
| INVENTOR(S) | : Michael Burrows et al. | |

It is certified that error appears in the above-identified patent and that said Letters Patent is hereby corrected as shown below:

In column 4, line 36, after "and" insert -- a list --.

In column 10, line 44, in Claim 9, after "criteria" delete "," and insert -- ; --, therefor.

In column 12, line 6, in Claim 14, delete "arc" and insert -- are --, therefor.

In column 12, line 12, in Claim 16, delete "tat" and insert -- that --, therefor.

Signed and Sealed this

Twenty-fifth Day of August, 2009

David J. Kappos
*Director of the United States Patent and Trademark Office*